United States Patent
Grein et al.

(10) Patent No.: US 10,087,319 B2
(45) Date of Patent: Oct. 2, 2018

(54) POLYPROPYLENE COMPOSITION

(71) Applicant: SABIC GLOBAL TECHNOLOGIES B.V., Bergen op Zoom (NL)

(72) Inventors: Christelle Marie Hélène Grein, Heel (NL); Franciscus Elisabeth Jacobus Essers, Maastricht (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/538,778

(22) PCT Filed: Dec. 21, 2015

(86) PCT No.: PCT/EP2015/080714
§ 371 (c)(1),
(2) Date: Jun. 22, 2017

(87) PCT Pub. No.: WO2016/102421
PCT Pub. Date: Jun. 30, 2016

(65) Prior Publication Data
US 2017/0349736 A1    Dec. 7, 2017

(30) Foreign Application Priority Data
Dec. 22, 2014  (EP) .................................. 14199668

(51) Int. Cl.
*C08L 23/10* (2006.01)
*C08L 23/14* (2006.01)

(52) U.S. Cl.
CPC ....... *C08L 23/142* (2013.01); *C08L 2205/025* (2013.01); *C08L 2205/035* (2013.01)

(58) Field of Classification Search
CPC .......... C08L 23/10; C08L 23/12; C08L 23/14; C08L 23/142
See application file for complete search history.

(56) References Cited

U.S. PATENT DOCUMENTS 8,822,602 B2 * 9/2014 Leskinen .............. C08F 210/06
525/199
9,181,423 B2 * 11/2015 Kock ...................... C08L 23/14

FOREIGN PATENT DOCUMENTS

| EP | 2423257 A1 | 2/2012 |
|---|---|---|
| EP | 2452976 A1 | 5/2012 |
| EP | 2586823 A1 | 5/2013 |
| WO | 2010142540 A1 | 12/2010 |
| WO | 2012028252 A1 | 3/2012 |
| WO | 2013174733 A1 | 11/2013 |

OTHER PUBLICATIONS

International Search Report for International Application No. PCT/EP2015/080714; International Filing Date: Dec. 21, 2015; dated Feb. 17, 2016; 4 Pages.
Written Opinion of the International Searching Authority for International Application No. PCT/EP2015/080714; International Filing Date: Dec. 21, 2015; dated Feb. 17, 2016; 5 Pages.

* cited by examiner

*Primary Examiner* — Vu A Nguyen
(74) *Attorney, Agent, or Firm* — Cantor Colburn LLP

(57) ABSTRACT

The invention is directed to a polypropylene composition, to a three-dimensional article comprising said polypropylene composition, and to the use of said polypropylene composition. The polypropylene composition of the invention comprises a) a multimodal polypropylene homopolymer comprising at least the following fractions i) 10-30% by total weight of the polypropylene composition of a fraction with a melt flow index of 5-45 g/10 min; ii) 10-30% by total weight of the polypropylene composition of a fraction with a melt flow index of 50-200 g/10 min; and iii) 3-10% by total weight of the polypropylene composition of a fraction with a melt flow index of 250-900 g/10 min; wherein the melt flow index is as measured according to ISO 1133 using a 2.16 kg weight and at a temperature of 230° C.; b) 1-8% by total weight of the polypropylene composition of a first $C_2/C_3$ phase having an intrinsic viscosity at 135° C. of 1.5-2.5 dl/g, of which the ethylene content in the xylene cold soluble fraction is 45-65% by total weight of the xylene cold soluble fraction; c) 1-8% by total weight of the polypropylene composition of a second $C_2/C_3$ phase having an intrinsic viscosity at 135° C. of 2.6-4.0 dl/g, of which the ethylene content in the xylene cold soluble fraction is 45-65% by total weight of the xylene cold soluble fraction; d) 10-25% by total weight of the polypropylene composition of a $C_2/C_8$ phase having an intrinsic viscosity at 135° C. of 1.2-2.1 dl/g and a density of 0.85-0.89 g/cm3; and e) 10-30% by total weight of the polypropylene composition of a mineral filler.

20 Claims, No Drawings

POLYPROPYLENE COMPOSITION

CROSS REFERENCE TO RELATED APPLICATIONS

This application is a 371 of International Application No. PCT/EP2015/080714, filed Dec. 21, 2015, which claims priority to European Application No. 14199668.6, filed Dec. 22, 2014 which are incorporated herein by reference in their entirety.

The invention is directed to a polypropylene composition, to a three-dimensional article comprising said polypropylene composition, and to the use of said polypropylene composition, in particular for automotive articles.

Polypropylene compositions, and especially filled propylene copolymers, find wide application in automotive components and housing or covers for electrical or household appliances, because of their easy processability and favourable cost/performance balance. Standard propylene homopolymer has several deficiencies that prohibit its use in applications that require stiffness, toughness, like automotive parts. Typically, propylene homopolymers are too brittle and have low impact resistance particularly at low temperature. Impact performance can be dramatically improved by blending polypropylene with rubbery materials, during (multi-step) copolymerisation reactions or by separately mixing the components. Such polypropylene compositions are often referred to as propylene (high) impact copolymers or heterophasic polypropylene. These materials typically have a polypropylene homopolymer or copolymer matrix phase and an elastomeric dispersed phase. This elastomeric material is often a propylene copolymer comprising ethylene and/or other higher α-olefins. Thus, the polypropylene matrix contains (finely) dispersed inclusions being not part of the matrix and the inclusions are the elastomer. The term inclusion indicates that the matrix and the inclusion form different phases within the heterophasic polypropylene copolymer. The inclusions are for instance visible with high resolution microscopy, such as electron microscopy or scanning force microscopy.

The need for polypropylenes with excellent stiffness at high flowability is constantly increasing as down-gauging and light-weighing become more important with the need for saving energy resources. High flowability polypropylenes are typically used in moulding and particularly the automotive business where injection moulding is the preferred conversion process. While high flow materials generally show the same or even higher stiffness than comparable lower flow grade materials, the impact performance typically becomes reduced due to shorter polymer chains, which form less entanglement.

High flow heterophasic materials are particularly desired in the automotive field. It is desired to replace automotive parts which may be subjected to extremely low temperatures such as −30 or −40° C. and which are still being made from metal alloys by lighter plastics.

Generally speaking, flowability of a heterophasic polypropylene resin can be increased by increasing the melt flow index of the matrix phase. However, there are certain limitations. A too low viscosity of the matrix relative to the viscosity of the rubber will result in coarse morphology of the dispersed phase and in turn in poor impact performance especially at low temperatures.

WO-A-2012/028252 describes a heterophasic propylene resin comprising a crystalline polypropylene homopolymer matrix (A) and an amorphous propylene/ethylene or propylene/α-olefin copolymer phase (B) dispersed within the matrix, wherein the heterophasic polypropylene resin has a melt flow rate $MFR_2$ according to ISO 1133 at 230° C./2.16 kg of 25 to below 100 g/10 min and a fraction insoluble in p-xylene at 25° C. (XCU) with an intrinsic viscosity of less than 1.1 dl./g, determined according to DIN EN ISO 1628-1 and −3, and a melting point of more than 150° C., and a fraction soluble in p-xylene at 25° C. (XCS) having an ethylene and/or α-olefin content of 40 to 70 wt. % and showing no melting point in a DSC analysis in the range between 0 and 300° C.

WO-A-2013/174733 describes a polymer composition based on a heterophasic material and a high density polyethylene, wherein the heterophasic material is featured by a broad molecular weight distribution and rather moderate xylene cold soluble content (XCS) and comonomer content. The heterophasic material described in this patent application preferably comprises a matrix of at least three polypropylene fractions which differ in the melt flow rate.

EP-A-2 423 257 describes a polypropylene composition which is prepared by adding a heterophasic propylene copolymer with low intrinsic viscosity and a polyethylene plastomer with moderate intrinsic viscosity to a heterophasic propylene copolymer with a propylene rich elastomeric phase. The resulting polypropylene composition has a matrix phase comprising both propylene homopolymer as well as propylene copolymer.

There remains a need in the art for polypropylene compositions that have an improved balance of flowability and mechanical properties (in particular low temperature impact properties) which can easily be injection moulded. Objective of the invention is to address this need in the art and overcome drawbacks in the prior art.

The inventors now found a polypropylene composition that combines an improved flow, while maintaining desirable mechanical properties (or wherein loss of mechanical properties is reduced to a minimum).

Accordingly, in a first aspect the invention is directed to a polypropylene composition comprising:
a) a multimodal polypropylene homopolymer comprising at least the following fractions
   i) 10-30% by total weight of the polypropylene composition of a fraction with a melt flow index of 5-45 g/10 min;
   ii) 10-30% by total weight of the polypropylene composition of a fraction with a melt flow index of 50-200 g/10 min; and
   iii) 3-10% by total weight of the polypropylene composition of a fraction with a melt flow index of 250-900 g/10 min; wherein the melt flow index is measured according to ISO 1133 using a 2.16 kg weight and at a temperature of 230° C.;
b) 1-8% by total weight of the polypropylene composition of a first $C_2/C_3$ phase having an intrinsic viscosity at 135° C. of 1.5-2.5 dl/g, of which the ethylene content in the xylene cold soluble fraction is 45-65% by total weight of the xylene cold soluble fraction;
c) 1-8% by total weight of the polypropylene composition of a second $C_2/C_3$ phase having an intrinsic viscosity at 135° C. of 2.6-4.0 dl/g, of which the ethylene content in the xylene cold soluble fraction is 45-65% by total weight of the xylene cold soluble fraction;
d) 10-25% by total weight of the polypropylene composition of a $C_2/C_8$ phase having an intrinsic viscosity at 135° C. of 1.2-2.1 dl/g and a density of 0.85-0.89 g/cm$^3$; and
e) 10-30% by total weight of the polypropylene composition of a mineral filler.

The inventors surprisingly found that the polypropylene composition of the invention combines excellent flowability properties with desirable mechanical properties, including low temperature impact strength, tensile strength and elongation at break. In the context of this application, the $C_2/C_3$ phase is assumed to be reflected by the XSC (xylene cold soluble) fraction measured according to the method described in the test method section.

The polypropylene composition of the invention comprises a multimodal polypropylene homopolymer. The term "multimodal" as used in this application is meant to refer that the homopolymer comprises at least multiple fractions that are characterised by different properties, in more particular a different melt flow index.

Preferably, the multimodal polypropylene homopolymer is a trimodal polypropylene homopolymer. In such as case, the molecular weight distribution of the polypropylene composition resulting from a mixture of three homopolymers with different melt flow index as described before is broader than that of a polypropylene composition resulting from a single homopolymer showing the same total melt flow index as the said mixture when each mentioned fraction is produced with the same chemistry and process at similar reactor conditions.

The first faction of the multimodal polypropylene homopolymer has a melt flow index of 5-45 g/10 min, preferably 6-40 g/10 min, more preferably 7-30 g/10 min. This fraction can have a weight average molecular weight as measured by gel permeation chromatography, such as in the range of 550,000 g/mol or less, such as 500,000 g/mol or less, or in the range of 450,000-220,000 g/mol.

The second fraction of the multimodal polypropylene homopolymer has a melt flow index of 50-200 g/10 min, preferably 60-170 g/10 min, more preferably 70-150 g/10 min. This fraction can have a weight average molecular weight as measured by gel permeation chromatography, such as in the range of 210,000 g/mol or less, such as 200,000 g/mol or less, or in the range of 190,000-150,000 g/mol.

The third fraction of the multimodal polypropylene homopolymer has a melt flow index of 250-900 g/10 min, preferably 280-800 g/10 min, more preferably 300-700 g/10 min. This fraction can have a relatively low weight average molecular weight as measured by gel permeation chromatography, such as in the range of 120,000 g/mol or less, such as 100,000 g/mol or less, or in the range of 80,000-40,000 g/mol.

The melt flow index as described herein is measured according to ISO 1133 using a 2.16 kg weight and at a temperature of 230° C.

The weight ratio between the first fraction of the multimodal polypropylene homopolymer (i.e. the fraction with a melt flow index of 5-45 g/10 min) and the second fraction of the multimodal polypropylene homopolymer (i.e. the fraction with a melt flow index of 50-200 g/10 min) is preferably 3:1 to 1:3, more preferably 2:1 to 1:2, even more preferably 1.5:1 to 1:1.5.

The weight ratio between the second fraction of the multimodal polypropylene homopolymer (i.e. the fraction with a melt flow index of 50-200 g/10 min) and the second fraction of the multimodal polypropylene homopolymer (i.e. the fraction with a melt flow index of 250-900 g/10 min) is preferably 1:1 to 10:1, more preferably 1.5:1 to 5:1, even more preferably 2:1 to 4:1.

For example, the multimodal polypropylene homopolymer can comprise
i) 15-25% by total weight of the polypropylene composition of the fraction with a melt flow index of 5-45 g/10 min, preferably 17-23%;
ii) 15-25% by total weight of the polypropylene composition of the fraction with a melt flow index of 50-200 g/10 min, preferably 17-23%; and
iii) 4-9% by total weight of the polypropylene composition of the fraction with a melt flow index of 250-900 g/10 min, preferably 5-8%.

The multimodal polypropylene homopolymer is comprised in the matrix phase of the polypropylene composition. Optionally, the matrix phase can also comprise propylene copolymer, but it is preferred that the amount of propylene copolymer is limited, or even absent. Suitably, the amount of propylene copolymer in the matrix phase is 10% or less by total weight of the matrix phase, preferably 5% or less, such 2% or less, or 1% or less. In a specific embodiment, the matrix phase is substantially free of propylene copolymer, or substantially consists of polypropylene homopolymer. The inventors found that limiting the amount of propylene copolymer in the matrix phase (all other parameters being equal) leads to a surprising increase of the stiffness of the material, reflected by an increase in tensile modulus and flexural modulus. Additionally, the inventors found that a low amount of propylene copolymer in the matrix phase results in a higher temperature resistance, reflected by an increase in melting temperature and heat deflection temperature.

The polypropylene composition further comprises a first $C_2/C_3$ phase having an intrinsic viscosity at 135° C. of 1.5-2.5 dl/g. The amount of ethylene monomer units in the xylene cold soluble fraction of this first $C_2/C_3$ phase is 45-65% by total weight of the xylene cold soluble fraction, preferably 47-63%, more preferably 50-60%.

The amount of the first $C_2/C_3$ phase in the composition is 1-8% by total weight of the polypropylene composition, preferably 2-7%, such as 3-6%.

As a further component, the polypropylene composition comprises a second $C_2/C_3$ phase having an intrinsic viscosity at 135° C. of 2.6-4.0 dl/g. The amount of ethylene monomer units in the xylene cold soluble fraction of this first $C_2/C_3$ phase is 45-65% by total weight of the xylene cold soluble fraction, preferably 47-63%, more preferably 50-60%.

The amount of the second $C_2/C_3$ phase in the composition is 1-8% by total weight of the polypropylene composition, preferably 2-7%, such as 3-6%.

As a further component, the polypropylene composition of the invention comprises a $C_2/C_8$ phase having an intrinsic viscosity at 135° C. of 1.2-2.1 dl/g. The $C_2/C_8$ phase (viz. ethylene-octene elastomer) can be produced by copolymerizing ethylene monomer and octene monomer in the presence of a metallocene catalyst which preferably comprises a metallocene compound and an alumoxane. The $C_8$ (octene) content in the $C_2/C_8$ phase is preferably 20-40% by total weight of the $C_2/C_8$ phase, such as 25-38%. A $C_8$ content of less than 20% by total weight of the $C_2/C_8$ phase may lead to decreased impact strength of shaped articles. The substantial part of the remainder of the $C_2/C_8$ phase is ethylene.

The density of the $C_2/C_8$ phase is 0.85-0.89 g/cm$^3$, preferably 0.86-0.88 g/cm$^3$. The melt flow index of the $C_2/C_8$ phase as measured at 190° C. under a load of 2.16 kg weight is preferably 0.5 g/10 min or more, preferably 1-20 g/10 min, and more preferably 2-10 g/10 min, such as 3-9 g/10 min. When the melt flow index of the $C_2/C_8$ phase is less than 0.5 g/10 min, the mouldability of the composition is reduced, and the impact strength of the shaped articles may be reduced when melt flow index of the $C_2/C_8$ phase exceeds 30 g/10 min.

The specific selection of elastomers, including ethylene/propylene and ethylene/octene rubbers, contributes to the impact strength of the overall composition both at ambient and at low temperatures.

The polypropylene composition of the invention additionally comprises a mineral filler. This filler aids in achieving the desired level of stiffness and coefficient of linear thermal expansion (CLTE). The amount of mineral filler is 10-30% by total weight of the polypropylene composition, preferably 13-27%, more preferably 15-25%. If the amount of filler is too high, then the flowability and impact strength of the polypropylene composition are negatively affected. If the amount of filler is too low, then the stiffness of the polypropylene composition is negatively affected.

Preferably, the mineral filler is selected from the group consisting of mica, wollastonite, kaolinite, smectite, montmorillonite and talc, preferably the mineral filler is talc.

The inorganic filler can suitably have a median particle size $d_{50}$ in the range of 0.5-15 µm and a $d_{95}$ of 1-50 µm. When $d_{50}$>0.5 µm and $d_{95}$>50 µm, the reinforcing effect of the inorganic filler becomes relatively small. When $d_{50}$<0.5 µm and $d_{95}$<1 µm, the energy which is required for a homogeneous distribution of the filler particles in the polypropylene composition becomes unfavourably large. The median particle size $d_{50}$ is clearly defined as the size in microns that splits the distribution with half above and half below this diameter. The default $d_{50}$ is the volume median (i.e. the median for a volume distribution). A usual method for measuring particle size distribution (including $d_{50}$ and $d_{95}$) is a laser diffraction method. The $d_{95}$ represents the particle size, for which 95 percent of the particles are finer.

In a preferred embodiment, the mineral filler is talc having a median particle size $d_{50}$ of 0.8-12 µm when measured on uncompacted material according to ISO 13317-3 using a Sedigraph, preferably a $d_{50}$ of 2.0-10 µm, more preferably a $d_{50}$ of 1.0-5 µm. The talc can further have a $d_{95}$ of 1.0-40 µm when measured on uncompacted material according to ISO 13317-3 using a Sedigraph, preferably a $d_{95}$ of 2.0-30 µm, more preferably a $d_{50}$ of 1.0-5 µm and a $d_{95}$ of 2.0-10 µm.

Suitably, the mineral filler has a BET nitrogen surface area as measured according to DIN 66131-2 of 8-25 m$^2$/g, preferably 9-22 m$^2$/g, more preferably 10-20 m$^2$/g.

Optionally, the polypropylene composition of the invention can comprise a high melt strength polypropylene. It is preferred, however, that the amount of high melt strength polypropylene in the polypropylene composition is limited, such as 10% or less by total weight of the polypropylene composition, preferably 5% or less, such 2% or less, or 1% or less. In a specific embodiment, the polypropylene composition is substantially free of high melt strength polypropylene. The presence of high melt strength polypropylene in the polypropylene composition leads to some degree of orientation in the system. This yields a higher stiffness, however, only in the machine direction of the injection moulded specimen, which for many applications is not desirable.

As optional components, the polypropylene composition of the invention can further comprise additives in an amount of up to 4% by total weight of the polypropylene composition, preferably 0.1-3.7%, more preferably 0.5-3.5%. These additives may be included during the polymerisation process of the polymers used for obtaining the polymer blend and/or they may be added to the polypropylene composition before, during or after blending. Suitable additives for the polypropylene composition of the invention include miscible thermoplastics, antioxidants, stabilisers (including hindered amine light stabilisers), UV stabilisers, acid scavengers, antistatic agents, lubricants, demoulding agents, slip agents, nucleating agents, fillers, colouring agents, foaming agents, anti-scratch agents, and pigments (including carbon black).

The components of the polypropylene composition of the invention can be mixed, in particular melt blended, according to any conventional procedure known in the art. The polypropylene composition of the invention is preferably produced by combining the various components in a melt mixing device. Melt mixing devices suited for this process include discontinuous and continuous kneaders, twin screw extruders and single screw extruders with special mixing sections and co-kneaders. The resident time must be chosen such that a sufficiently high degree of homogenization is achieved.

The polypropylene composition of the invention suitably exhibits a melt flow index of 25 g/10 min or more as measured according to ISO 1133 using a 2.16 kg weight and at a temperature of 230° C., preferably 30 g/10 min or more, such as 30-40 g/10 min.

Advantageously, the composition of the invention preferably exhibits a Charpy notched impact strength at 23° C. as measured according to ISO 179/1eA of 25 kJ/m$^2$ or more, preferably 30 kJ/m$^2$ or more, such as 30-50 kJ/m$^2$. Further, the composition of the invention preferably exhibits a Charpy notched impact strength at −20° C. as measured according to ISO 179/1eA of 4.0 kJ/m$^2$ or more, preferably 4.5 kJ/m$^2$ or more, such as 5.0-7.0 kJ/m$^2$.

The flexural modulus of the polypropylene composition of the invention as measured according to ISO 178 is preferably 1500 MPa or more, preferably 1600 MPa or more, such as 1700-1900 MPa. Additionally, the polypropylene composition of the invention may have a tensile modulus as measured according to ISO 527-2 of 1500 MPa or more, preferably 1600 MPa or more, such as 1600-1800 MPa.

The polypropylene composition of the invention further suitably exhibits an elongation at break as measured according to ISO 527-3 of 50% or more, preferably 55% or more, such as 55-80%.

Preferably, the polypropylene composition according to invention exhibits a shrinkage of 1% or less, preferably 0.9% or less, more preferably 0.8% or less.

In a further aspect, the invention is directed to a three-dimensional article comprising a polypropylene composition according to the invention, preferably a moulded three-dimensional article such as an injection-moulded three-dimensional article.

Preferably, the three-dimensional article is in the form of an automotive article. Examples of three-dimensional articles include bumpers, side trims, step assists, body panels, spoilers, dashboards, interior trims and the like.

The three-dimensional article according to the invention can be a semi-finished or finished article made from the polypropylene composition by a moulding process. Examples of suitable moulding processes include injection moulding, compression moulding, extrusion and extrusion compression moulding. Injection moulding is most widely used to produce articles such as automotive parts. A semi-finished article may subsequently undergo further known processing steps.

In yet a further aspect the invention is directed to the use of a composition according to the invention for automotive articles. Examples of automotive articles include bumpers, bumper fascia, instrument panel structures, pillars, consoles, interior trims parts, and door panel parts.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

Test Methods
Xylene Cold Solubles
Xylene cold solubles were determined at 23° C. according to ISO 6427. Xylene solubles are defined as the percent by weight that stays in solution after the polymer sample is dissolved in hot xylene and the solution is allowed to cool to 23° C. The ethylene content of the xylene cold soluble fraction was determined by Fourier transform infrared measurements on the soluble fractions.

Melt Flow Index
The melt flow index was measured according to ISO 1133 with a load of 2.16 kg at 230° C. Melt flow index of different fractions of the homopolymer were measured by separately collecting the different fractions during the production process.

Charpy Notched Impact Strength
Charpy notched impact strength was determined according to ISO 179-1eA:2000 on V-notched samples of 80×10×4 mm at 23° C. and −20° C.

The test specimens were prepared by injection moulding according to ISO 1873-2.

Flexural Modulus
Flexural modulus was measured according to ISO 178 at 23° C., using injection moulded test specimens as described in EN ISO 1873-2 (80×10×4 mm).

Tensile Modulus and Elongation at Break
Tensile modulus and elongation at break were measured according to ISO 527-2 and 527-3 at 1 mm/min and 23° C. Test specimens as described in EN ISO 1873-2 (80×10×4 mm) were used.

Intrinsic Viscosity
Intrinsic viscosity was measured according to DIN ISO 1628-1 (October 1999) in Decalin at 135° C.

Density
Density was determined according to ISO 1183.

Shrinkage
Mould shrinkage, in the context of this invention called shrinkage, is the amount of contraction that a moulded part undergoes when it is removed from the mould cavity and cooled at room temperature. Shrinkage was measured according to ISO 294-4 on 65×65×3.2 mm injection moulded plaques after a conditioning time of 24 h after moulding at room temperature (23° C.) and 50% relative humidity. Each of the samples was moulded using the same conditions at the moulding machine. Shrinkage measured in the flow length and perpendicular to the flow is reported here. Following equation was used to determine shrinkage:

$$\frac{L_m - L_s}{L_m} \times 100 = \text{shrinkage}[\%]$$

wherein $L_m$ is the length of the mould in the considered direction, and $L_s$ is the length of the specimen in considered direction. A shrinkage in the flow direction, a shrinkage in the perpendicular direction to flow direction, as well as an average (arithmetic) of both shrinkage values is reported.

EXAMPLES

Table 1 below shows the formulation of a comparative and inventive polypropylene composition.

TABLE 1

| Component | Supplier | Component description | Comparative example (wt. %) | Inventive example (wt. %) |
|---|---|---|---|---|
| PP 513MNK10 [1] | Sabic | polypropylene block copolymer | 25 | 30 |
| PP 48M10 [2] | Sabic | polypropylene block copolymer | 20 | 20 |
| H-PP MFR440 | | Polypropylene homopolymer, experimental sample obtained by shifting (i.e. visbreaking) a conventional homopolymer with a MFI of 50 to 440 g/10 min | — | 5 |
| ENGAGE ™ 8200 | The Dow Chemical Company | ethylene-octene copolymer | 20 | 20 |

TABLE 1-continued

| Component | Supplier | Component description | Comparative example (wt. %) | Inventive example (wt. %) |
|---|---|---|---|---|
| ImiFabi Ultra 5C | ImiFabi Talc | talc | 20 | 20 |
| Exxelor™ PO1020 | Exxon Mobil | maleic anhydride functionalised homopolypropylene | 0.2 | 0.2 |

[1] PP513MNK10 is a polypropylene block copolymer with a matrix MFI of 70 g/10 min, a total MFI of 65 g/10 min (after visbreaking from an MFI of 35 g/10 min), a rubber content expressed as XCS of 16.5 wt. %, an intrinsic viscosity of the XCS fraction of 2.2 dl/g and a C2-content of the XCS fraction of 49 wt. %.
[2] PP 48M10 is a polypropylene block copolymer with a matrix MFI of 30 g/10 min, a total MFI of 14 g/10 min, a rubber content expressed as XCS of 15 wt. %, an intrinsic visocisty of the XCS fraction of rubber of 2.9 dl/g and a C2-content of the XCS fraction of 52 wt. %

Table 2 shows various properties determined for the comparative and inventive example.

TABLE 2

| | Comparative example | Inventive example |
|---|---|---|
| Melt flow index (g 10 min) | 17.6 | 36.5 |
| Ash content (wt. %) | 20.8 | 20.1 |
| Charpy notched impact strength at 23° C. (kJ/m$^2$) | 37 | 33.5 |
| Charpy notched impact strength at −20° C. (kJ/m$^2$) | 5.4 | 5.2 |
| Flexural modulus (MPa) | 1715 | 1750 |
| Tensile modulus (MPa) | 1650 | 1750 |
| Elongation at break (%) | 70 | 60 |
| Average Shrinkage after 24 h at 23° C. (%) | 0.63 | 0.66 |
| Shrinkage parallel to flow after 24 h at 23° C. (%) | 0.59 | 0.63 |
| Shrinkage perpendicular to flow after 24 h at 23° C. (%) | 0.67 | 0.69 |

The invention claimed is:

1. Polypropylene composition comprising:
   a) a multimodal polypropylene homopolymer comprising at least the following fractions
      i) 10-30% by total weight of the polypropylene composition of a fraction with a melt flow index of 5-45 g/10 min;
      ii) 10-30% by total weight of the polypropylene composition of a fraction with a melt flow index of 50-200 g/10 min; and
      iii) 3-10% by total weight of the polypropylene composition of a fraction with a melt flow index of 250-900 g/10 min;
   wherein the melt flow index is as measured according to ISO 1133 using a 2.16 kg weight and at a temperature of 230° C.;
   b) 1-8% by total weight of the polypropylene composition of a first $C_2/C_3$ phase having an intrinsic viscosity at 135° C. of 1.5-2.5 dl/g, of which the ethylene content in the xylene cold soluble fraction is 45-65% by total weight of the xylene cold soluble fraction;
   c) 1-8% by total weight of the polypropylene composition of a second $C_2/C_3$ phase having an intrinsic viscosity at 135° C. of 2.6-4.0 dl/g, of which the ethylene content in the xylene cold soluble fraction is 45-65% by total weight of the xylene cold soluble fraction;
   d) 10-25% by total weight of the polypropylene composition of a $C_2/C_8$ phase having an intrinsic viscosity at 135° C. of 1.2-2.1 dl/g and a density of 0.85-0.89 g/cm$^3$; and
   e) 10-30% by total weight of the polypropylene composition of a mineral filler.

2. Polypropylene composition according to claim 1, wherein the multimodal polypropylene homopolymer a) is a trimodal polypropylene homopolymer.

3. Polypropylene composition according to claim 1, wherein fraction i) of the multimodal polypropylene homopolymer has a melt flow index of 7-30 g/10 min.

4. Polypropylene composition according to claim 1, wherein fraction ii) of the multimodal polypropylene homopolymer has a melt flow index of 70-150 g/10 min.

5. Polypropylene composition according to claim 1, wherein the composition comprises 15-25% by total weight of the polypropylene composition of the multimodal polypropylene homopolymer fraction with a melt flow index of 5-45 g/10 min.

6. Polypropylene composition according to claim 1, wherein the composition comprises 15-25% by total weight of the polypropylene composition of the multimodal polypropylene homopolymer fraction with a melt flow index of 50-200 g/10 min.

7. Polypropylene composition according to claim 1, wherein the composition comprises 4-9% by total weight of the polypropylene composition of the multimodal polypropylene homopolymer fraction with a melt flow index of 250-900 g/10 min.

8. Polypropylene composition according to claim 1, wherein the composition comprises 5-8% by total weight of the polypropylene composition of the multimodal polypropylene homopolymer fraction with a melt flow index of 250-900 g/10 min.

9. Polypropylene composition according to claim 1, wherein the mineral filler is selected from the group consisting of mica, wollastonite, kaolinite, smectite, montmorillonite and talc.

10. Polypropylene composition according to claim 1, wherein the mineral filler has a median particle size $d_{50}$ of 0.8-12.0 μm when measured on uncompacted material according to ISO 13317-3 using a Sedigraph.

11. Polypropylene composition according to claim 1, wherein the mineral filler has a median particle size $d_{50}$ of 1.0-5.0 μm when measured on uncompacted material according to ISO 13317-3 using a Sedigraph.

12. Polypropylene composition according to claim 1, wherein the mineral filler has a BET nitrogen surface area as measured according to DIN 66131-2 of 8-25 m$^2$/g.

13. Polypropylene composition according to claim 1, wherein the mineral filler has a BET nitrogen surface area as measured according to DIN 66131-2 of 10-20 m$^2$/g.

14. Polypropylene composition according to claim 1, wherein said composition exhibits a Charpy notched impact strength at 23° C. as measured according to ISO 179-1eA of 25 kJ/m$^2$ or more.

15. Polypropylene composition according to claim 1, wherein said composition exhibits a Charpy notched impact strength at 23° C. as measured according to ISO 179-1eA of 30-50 kJ/m$^2$.

16. Polypropylene composition according to claim 1, wherein said composition exhibits a flexural modulus as measured according to ISO 178 of 1500 MPa or more.

17. Polypropylene composition according to claim 1, wherein said composition exhibits a flexural modulus as measured according to ISO 178 of 1700-1900 MPa.

18. Polypropylene composition according to claim 1, wherein said composition exhibits an elongation at break as measured according to ISO 527-3 of 50% or more.

19. Three-dimensional article comprising a polypropylene composition according to claim 1.

20. Three-dimensional article according to claim 19, in the form of an automotive article.

* * * * *